J. W. McMILLAN.
Milk Cooler.

No. 104,180.  Patented June 14, 1870.

Witnesses.  Inventor.

United States Patent Office.

JAMES W. McMILLAN, OF GRANGER, OHIO

Letters Patent No. 104,180, dated June 14, 1870.

IMPROVEMENT IN MILK-COOLERS.

The Schedule referred to in these Letters Patent and making part of the same.

Be it known that I, JAMES W. McMILLAN, of Granger, in the county of Medina and State of Ohio, have invented a certain new and Improved Milk-Cooler, of which the following is a specification.

Drawing.

Figure 1:
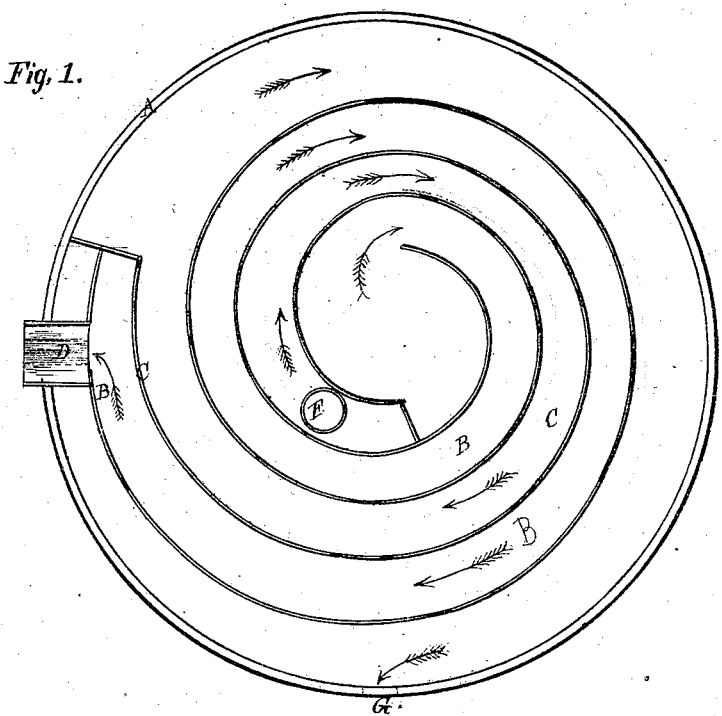
Figure 2:
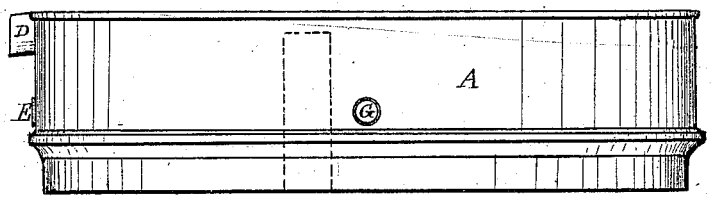

Figure 1 is a top view of the cooler.
Figure 2, a side view.
Like letters of reference refer to like parts in the different views.

Objective.

This invention has for its object the rapid removal of the animal heat in milk immediately taken from the cow, so that the process of its manufacture into cheese may be as little delayed as possible.

In the drawing—

Fig. 2, A represents a tank or vat, the capacity of which may be more or less, according to the quantity of milk to be cooled at once.

Within said vat is arranged two concentric channels B C, the channel B having an upper outlet at D, also immediately below an outlet, E, the purpose of which will presently be shown.

The channel C is provided with an inlet, F, fig. 2, near the center, also an outlet, G, at one side near the bottom; both the outlets of the two channels may be fitted with stop-cocks, for the convenience of drawing off the contents of the vat.

The practical operation of this cooler is as follows:

The milk, as soon as taken from the cow, is poured into the channel B at the open space at the center, which will flow around in the channel to the outlet D.

The channel C is now filled with water, through the pipe F, from a reservoir situated above the tank, or forced into it by a pump.

The pipe F is less in height than the walls of the channels, hence the inflowing water will flow from its pipe into the water-channel only, and not rise above them and flow over into the milk-channel. The outflow of the water being equal to its inflow, hence a constant stream of cold water is passing through the cooler, and around the channel filled with milk, which, by the large surface exposed to the cold walls of the water course, its heat is quickly removed, and its odors dissipated, thereby rendering it fit in a few minutes for the curd-tub.

The cooled milk may all be drawn off at once through the outlet E, and the channel again filled, or it may be allowed to flow from the vat through the outlet D by pouring more warm milk into the channel at the center, thereby raising it above the outlet, as the milk will become sufficiently cool by the time it flows around to the outlet.

The construction of this vat is such that it is easily kept clean, and having a wide open top, it is open to observation, and therefore it can be seen whether any lodgement of the milk is in or about the milk-channel, or other matter that should be removed for cleanliness sake.

The bottom of the milk-channel is shown as being formed by the bottom of the tank. The channel, however, may be constructed with a bottom independent of that, and elevated therefrom, so that the water may flow under as well as around the sides.

It will be seen that the bottom of the vat is supported by a supplementary bottom of wood, thereby giving greater strength and durability to the cooler.

Claim.

What I claim as my invention, and desire to secure by Letters Patent, is—

A milk-cooler, when constructed with eccentric water and milk-channels B C, with inlets and outlets thereto, in the manner substantially as described, and for the purpose set forth.

JAMES W. McMILLAN.

Witnesses:
T. H. BURRIDGE,
FRANK ALDEN.